(12) United States Patent
Brauer et al.

(10) Patent No.: US 12,229,935 B2
(45) Date of Patent: Feb. 18, 2025

(54) SEMANTIC IMAGE SEGMENTATION FOR SEMICONDUCTOR-BASED APPLICATIONS

(71) Applicant: KLA Corporation, Milpitas, CA (US)

(72) Inventors: Bjorn Brauer, Beaverton, OR (US); Richard Wallingford, Ames, IA (US)

(73) Assignee: KLA Corporation, Milpitas, CA (US)

( * ) Notice: Subject to any disclaimer, the term of this patent is extended or adjusted under 35 U.S.C. 154(b) by 392 days.

(21) Appl. No.: 17/711,043

(22) Filed: Apr. 1, 2022

(65) Prior Publication Data
US 2022/0318986 A1 Oct. 6, 2022

Related U.S. Application Data

(60) Provisional application No. 63/170,579, filed on Apr. 5, 2021.

(51) Int. Cl.
G06T 7/00 (2017.01)
G06N 3/08 (2023.01)
(Continued)

(52) U.S. Cl.
CPC ............. G06T 7/0004 (2013.01); G06N 3/08 (2013.01); G06T 7/10 (2017.01); G06V 10/7747 (2022.01);
(Continued)

(58) Field of Classification Search
CPC ............. G06T 7/0004; G06T 7/10; G06T 2207/10061; G06T 2207/20081; G06T 2207/30148; G06T 2207/20084; G06T 2207/10081; G06T 7/11; G06T 7/0012; G06T 2207/10024; G06T 7/12; G06T 2207/10016; G06T 19/20; G06T 2207/30261; G06T 7/0002; G06T 2200/24; G06T 17/00; G06T 17/005; G06T 15/10; G06T 7/00; G06T 7/181; G06T 7/001; G06T 15/005; G06T 1/20; G06T 2207/30141; G06N 3/08; G06N 3/0455; G06N 3/0464; G06N 3/0475; G06N 3/094;
(Continued)

(56) References Cited

U.S. PATENT DOCUMENTS 7,570,796 B2   8/2009   Zafar et al.
7,676,077 B2   3/2010   Kulkarni et al.
(Continued)

OTHER PUBLICATIONS

International Search Report for PCT/US2022/023249 mailed Jul. 13, 2022.
(Continued)

*Primary Examiner* — Nimesh Patel
(74) *Attorney, Agent, or Firm* — Entropy Matters LLC

(57) ABSTRACT

Methods and systems for determining information for a specimen are provided. One system includes a computer subsystem and one or more components executed by the computer subsystem. The one or more components include a semantic segmentation model configured for assigning labels to each of multiple pixels in an image responsive to what is represented in each of the multiple pixels. The image is an image of a specimen generated by an imaging subsystem. The computer subsystem is configured for determining information for the specimen from the assigned labels and without a reference image for the specimen.

18 Claims, 6 Drawing Sheets

(51) Int. Cl.
  *G06T 7/10* (2017.01)
  *G06V 10/774* (2022.01)
  *G06V 20/70* (2022.01)

(52) U.S. Cl.
  CPC .... *G06V 20/70* (2022.01); *G06T 2207/10061* (2013.01); *G06T 2207/20081* (2013.01); *G06T 2207/30148* (2013.01)

(58) Field of Classification Search
  CPC .......... G06N 3/045; G06N 3/084; G06N 3/04; G06N 7/01; G06N 3/02; G06N 3/047; G06N 20/00; G06N 3/061; G06N 3/082; G06N 3/09; G06N 5/04; G06N 3/088; G06N 5/046; G06N 5/00; G06N 3/091; G06N 5/025; G06N 3/044; G06N 3/042; G06N 3/049; G06V 10/7747; G06V 20/70; G06V 2201/06; G06V 10/26; G06V 10/774; G06V 10/82; G06V 10/764; G06V 10/267; G01N 21/9501; G01N 21/956; G01N 21/8851; G01N 2021/8887; G01N 21/95607; G01N 15/1433; H01L 27/14609; H01L 27/146; H01L 27/14687; H01L 27/14605; H01L 22/12; H01L 27/1462; H01L 22/00; H01L 27/14645; H01L 21/268; H01L 21/3225; H01L 21/67259; H01L 21/02; H01L 21/02532
  See application file for complete search history.

(56) References Cited

U.S. PATENT DOCUMENTS

| | | | |
|---|---|---|---|
| 8,126,255 B2 | 2/2012 | Bhaskar et al. | |
| 8,664,594 B1 | 4/2014 | Jiang et al. | |
| 8,692,204 B2 | 4/2014 | Kojima et al. | |
| 8,698,093 B1 | 4/2014 | Gubbens et al. | |
| 8,716,662 B1 | 5/2014 | MacDonald et al. | |
| 9,222,895 B2 | 12/2015 | Duffy et al. | |
| 9,816,939 B2 | 11/2017 | Duffy et al. | |
| 2013/0188859 A1* | 7/2013 | Luo | G06T 7/0004 382/149 |
| 2016/0358337 A1* | 12/2016 | Dai | G06T 7/11 |
| 2017/0140253 A1* | 5/2017 | Wshah | G06V 20/54 |
| 2017/0200260 A1* | 7/2017 | Bhaskar | G06F 18/24133 |
| 2019/0347505 A1 | 11/2019 | He et al. | |
| 2020/0218241 A1 | 7/2020 | Soltanmohammadi et al. | |
| 2020/0226744 A1 | 7/2020 | Cohen et al. | |
| 2020/0410660 A1 | 12/2020 | Tandia et al. | |
| 2021/0209418 A1* | 7/2021 | Badanes | G06V 10/454 |
| 2021/0272273 A1 | 9/2021 | Brauer | |
| 2022/0084181 A1* | 3/2022 | Isken | G06N 20/00 |

OTHER PUBLICATIONS

Chen et al., "DeepLab: Semantic Image Segmentation with Deep Convolutional Nets, Atrous Convolution, and Fully Connected CRFs," arXiv: 1606.00915v2, Jun. 2, 2016, 14 pages.

Goodfellow et al., "Generative Adversarial Nets," arXiv:1406.2661, Jun. 10, 2014, 9 pages.

Isola et al., "Image-to-Image Translation with Conditional Adversarial Networks," arXiv:1611.07004v2, Nov. 22, 2017, 17 pages.

Kingma et al., "Semi-supervised Learning with Deep Generative Models," NIPS 2014, Oct. 31, 2014, pp. 1-9.

Long et al., "Fully convolutional networks for semantic segmentation," 2015 IEEE Conference on Computer Vision and Pattern Recognition, Jun. 7-12, 2015, pp. 3431-3440.

Makhzani et al., "Adversarial Autoencoders," arXiv: 1511.05644v2, May 25, 2016, 16 pages.

Mirza et al., "Conditional Generative Adversarial Nets," arXiv:1411. 1784, Nov. 6, 2014, 7 pages.

U.S. Appl. No. 17/308,878 by Brauer et al. filed May 5, 2021.

* cited by examiner

| | | | | | | | | | |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 1 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

↙ 400

| | | | | | | | | | |
|---|---|---|---|---|---|---|---|---|---|
| 0 | 0 | 0 | 0 | 0 | 0 | 0 | 0 | 0 | 0 |
| 0 | 2 | 0 | 2 | 0 | 2 | 2 | 0 | 0 | 0 |
| 0 | 2 | 0 | 2 | 0 | 2 | 2 | 0 | 2 | 2 |
| 0 | 2 | 0 | 0 | 2 | 0 | 0 | 0 | 2 | 2 |
| 0 | 2 | 0 | 2 | 2 | 2 | 2 | 0 | 0 | 0 |
| 0 | 2 | 0 | 2 | 0 | 2 | 2 | 0 | 0 | 0 |
| 0 | 2 | 0 | 2 | 2 | 0 | 0 | 0 | 2 | 2 |
| 0 | 2 | 0 | 2 | 0 | 2 | 2 | 0 | 2 | 2 |
| 0 | 2 | 0 | 2 | 0 | 2 | 2 | 0 | 0 | 0 |
| 0 | 0 | 0 | 0 | 0 | 0 | 0 | 0 | 0 | 0 |

↙ 402

| | | | | | | | | | |
|---|---|---|---|---|---|---|---|---|---|
| 3 | 3 | 3 | 3 | 3 | 3 | 3 | 3 | 3 | 3 |
| 3 | 0 | 3 | 0 | 3 | 0 | 0 | 3 | 3 | 3 |
| 3 | 0 | 3 | 0 | 3 | 0 | 0 | 3 | 0 | 0 |
| 3 | 0 | 3 | 0 | 3 | 3 | 3 | 3 | 0 | 0 |
| 3 | 0 | 3 | 0 | 3 | 0 | 0 | 3 | 3 | 3 |
| 3 | 0 | 3 | 0 | 3 | 0 | 0 | 3 | 3 | 3 |
| 3 | 0 | 3 | 0 | 3 | 3 | 3 | 3 | 0 | 0 |
| 3 | 0 | 3 | 0 | 3 | 0 | 0 | 3 | 0 | 0 |
| 3 | 0 | 3 | 0 | 3 | 0 | 0 | 3 | 3 | 3 |
| 3 | 3 | 3 | 3 | 3 | 3 | 3 | 3 | 3 | 3 |

SEMANTIC IMAGE SEGMENTATION FOR SEMICONDUCTOR-BASED APPLICATIONS

BACKGROUND OF THE INVENTION

1. Field of the Invention

The present invention generally relates to methods and systems for determining information for a specimen. Certain embodiments relate to a semantic segmentation model configured for assigning labels to each of multiple pixels in a specimen image.

2. Description of the Related Art

The following description and examples are not admitted to be prior art by virtue of their inclusion in this section.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on specimens to drive higher yield in the manufacturing process and thus higher profits. Inspection has always been an important part of fabricating semiconductor devices. However, as the dimensions of semiconductor devices decrease, inspection becomes even more important to the successful manufacture of acceptable semiconductor devices because smaller defects can cause the devices to fail.

Defect review typically involves re-detecting defects detected as such by an inspection process and generating additional information about the defects at a higher resolution using either a high magnification optical system or a scanning electron microscope (SEM). Defect review is therefore performed at discrete locations on specimens where defects have been detected by inspection. The higher resolution data for the defects generated by defect review is more suitable for determining attributes of the defects such as profile, roughness, more accurate size information, etc. Defects can generally be more accurately classified into defect types based on information determined by defect review compared to inspection.

Metrology processes are also used at various steps during a semiconductor manufacturing process to monitor and control the process. Metrology processes are different than inspection processes in that, unlike inspection processes in which defects are detected on a specimen, metrology processes are used to measure one or more characteristics of the specimen that cannot be determined using currently used inspection tools. For example, metrology processes are used to measure one or more characteristics of a specimen such as a dimension (e.g., line width, thickness, etc.) of features formed on the specimen during a process such that the performance of the process can be determined from the one or more characteristics. In addition, if the one or more characteristics of the specimen are unacceptable (e.g., out of a predetermined range for the characteristic(s)), the measurements of the one or more characteristics of the specimen may be used to alter one or more parameters of the process such that additional specimens manufactured by the process have acceptable characteristic(s).

Metrology processes are also different than defect review processes in that, unlike defect review processes in which defects that are detected by inspection are re-visited in defect review, metrology processes may be performed at locations at which no defect has been detected. In other words, unlike defect review, the locations at which a metrology process is performed on a specimen may be independent of the results of an inspection process performed on the specimen. In particular, the locations at which a metrology process is performed may be selected independently of inspection results. In addition, since locations on the specimen at which metrology is performed may be selected independently of inspection results, unlike defect review in which the locations on the specimen at which defect review is to be performed cannot be determined until the inspection results for the specimen are generated and available for use, the locations at which the metrology process is performed may be determined before an inspection process has been performed on the specimen.

There are many different ways to process images, output, etc. generated by tools configured as described above to determine information therefrom. Often, a test image is compared to a reference image so that any differences between the test image and the reference image can be determined and used to determine information for the specimen. In the case of inspection, many currently used defect inspection algorithms require a reference image to calculate a difference image and then perform defect detection based on the thresholded difference image. In a similar manner, a test image may be compared to a reference image to determine a relative characteristic in the case of metrology or to perform defect redetection in the case of defect review.

There are several disadvantages to using a reference image in the applications described above. For example, the reference image itself can introduce noise in the difference image making defect inspection less sensitive as the noise level is higher. The reference image can have similar impacts in defect review and metrology as well. In addition, many currently used defect inspection algorithms are based on detecting defects in a difference image, but in some cases it can be difficult or even impossible to generate a difference image when there is no suitable reference. For example, in the case of repeater defects, meaning the defect is present in every die, an image from one die cannot be used as a reference image for an image of another die since the defect signal in both images will be eliminated by subtraction rendering the repeater defect undetectable in the resulting difference image. Techniques like standard reference die (SRD) have been developed for such situations, but the success of such techniques often rests on the assumption that the original die is free of defects, which is not necessarily the case. Similar difficulties can also arise in relative metrology measurements and defect review re-detection.

Accordingly, it would be advantageous to develop systems and methods for determining information for a specimen that do not have one or more of the disadvantages described above.

SUMMARY OF THE INVENTION

The following description of various embodiments is not to be construed in any way as limiting the subject matter of the appended claims.

One embodiment relates to a system configured to determine information for a specimen. The system includes a computer subsystem and one or more components executed by the computer subsystem. The one or more components include a semantic segmentation model configured for assigning labels to each of multiple pixels in an image responsive to what is represented in each of the multiple pixels. The image is an image of a specimen generated by an imaging subsystem. The computer subsystem is configured for determining information for the specimen from the assigned labels and without a reference image for the specimen. The system may be further configured as described herein.

Another embodiment relates to a computer-implemented method for determining information for a specimen. The method includes assigning labels to each of multiple pixels in an image responsive to what is represented in each of the multiple pixels by inputting the image into a semantic segmentation model included in one or more components executed by a computer subsystem. The image is an image of a specimen generated by an imaging subsystem. The method also includes determining information for the specimen from the assigned labels and without a reference image for the specimen.

Each of the steps of the method may be further performed as described further herein. The method may include any other step(s) of any other method(s) described herein. The method may be performed by any of the systems described herein.

Another embodiment relates to a non-transitory computer-readable medium storing program instructions executable on a computer system for performing a computer-implemented method for determining information for a specimen. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which:

FIGS. 3-4 are schematic diagrams illustrating results that may be generated by the embodiments described herein;

Figure 1:
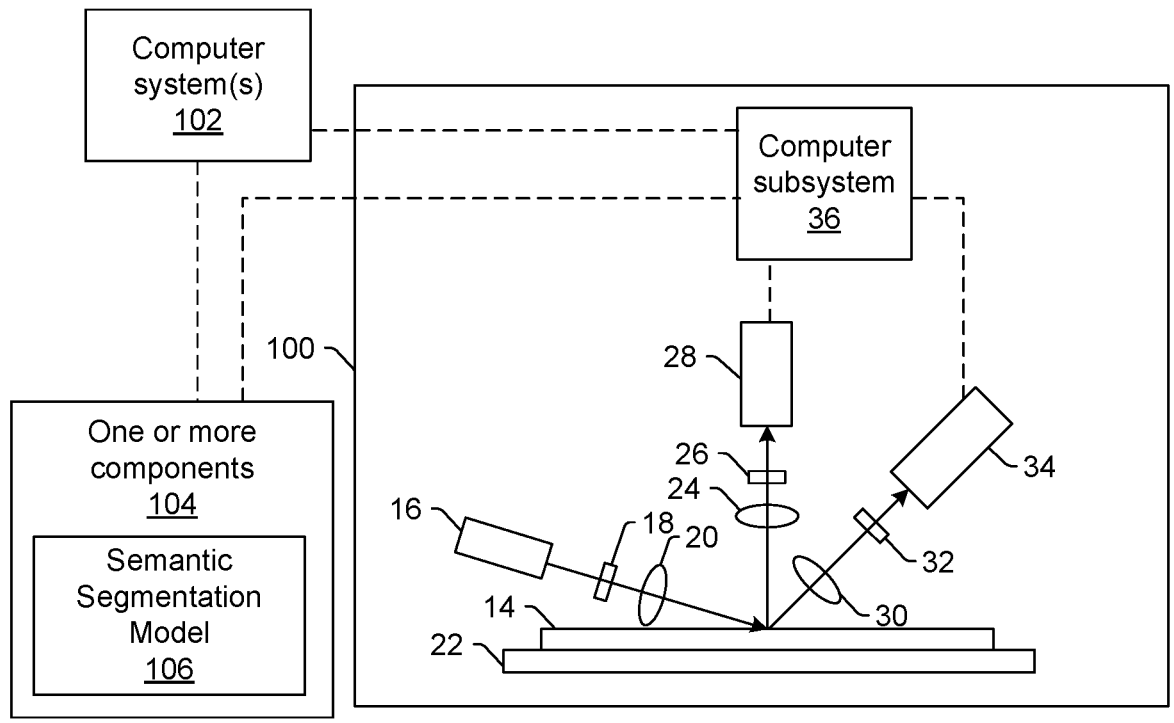
FIGS. 1 and 1a are schematic diagrams illustrating side views of embodiments of a system configured as described herein.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The terms "design," "design data," and "design information" as used interchangeably herein generally refer to the physical design (layout) of an IC or other semiconductor device and data derived from the physical design through complex simulation or simple geometric and Boolean operations. The design may include any other design data or design data proxies described in commonly owned U.S. Pat. No. 7,570,796 issued on Aug. 4, 2009 to Zafar et al. and U.S. Pat. No. 7,676,077 issued on Mar. 9, 2010 to Kulkarni et al., both of which are incorporated by reference as if fully set forth herein. In addition, the design data can be standard cell library data, integrated layout data, design data for one or more layers, derivatives of the design data, and full or partial chip design data. Furthermore, the "design," "design data," and "design information" described herein refers to information and data that is generated by semiconductor device designers in a design process and is therefore available for use in the embodiments described herein well in advance of printing of the design on any physical specimens such as reticles and wafers.

"Nuisances" (which is sometimes used interchangeably with "nuisance defects" or "nuisance events") as that term is used herein is generally defined as defects that a user does not care about and/or events that are detected on a specimen but are not really actual defects on the specimen. Nuisances that are not actually defects may be detected as events due to non-defect noise sources on a specimen (e.g., grain in metal lines on the specimen, signals from underlaying layers or materials on the specimen, line edge roughness (LER), relatively small critical dimension (CD) variation in patterned features, thickness variations, etc.) and/or due to marginalities in the inspection system itself or its configuration used for inspection.

The term "defects of interest (DOIs)" as used herein is defined as defects that are detected on a specimen and are actual defects on the specimen. Therefore, the DOIs are of interest to a user because users generally care about how many and what kind of actual defects are on specimens being inspected. In some contexts, the term "DOI" is used to refer to a subset of all of the actual defects on the specimen, which includes only the actual defects that a user cares about. For example, there may be multiple types of DOIs on any given specimen, and one or more of them may be of greater interest to a user than one or more other types. In the context of the embodiments described herein, however, the term "DOIs" is used to refer to any and all real defects on a specimen.

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

In general, the embodiments described herein are systems and methods for determining information for a specimen. More specifically, the embodiments described herein are configured for semantic segmentation of images for applications such as optical defect detection.

In some embodiments, the specimen is a wafer. The wafer may include any wafer known in the semiconductor arts. Although some embodiments may be described herein with respect to a wafer or wafers, the embodiments are not limited in the specimens for which they can be used. For example, the embodiments described herein may be used for specimens such as reticles, flat panels, personal computer (PC) boards, and other semiconductor specimens.

One embodiment of a system configured for determining information for a specimen is shown in FIG. 1. In some embodiments, the system includes an imaging subsystem such as imaging subsystem 100. The imaging subsystem includes and/or is coupled to a computer subsystem, e.g., computer subsystem 36 and/or one or more computer systems 102.

In general, the imaging subsystems described herein include at least an energy source, a detector, and a scanning subsystem. The energy source is configured to generate energy that is directed to a specimen by the imaging subsystem. The detector is configured to detect energy from the specimen and to generate output responsive to the detected energy. The scanning subsystem is configured to change a position on the specimen to which the energy is directed and from which the energy is detected. In one embodiment, as shown in FIG. 1, the imaging subsystem is configured as a light-based imaging subsystem. In this manner, the specimen images described herein may be generated by a light-based imaging subsystem.

In the light-based imaging subsystems described herein, the energy directed to the specimen includes light, and the energy detected from the specimen includes light. For example, in the embodiment of the system shown in FIG. 1, the imaging subsystem includes an illumination subsystem configured to direct light to specimen 14. The illumination subsystem includes at least one light source. For example, as shown in FIG. 1, the illumination subsystem includes light source 16. The illumination subsystem is configured to direct the light to the specimen at one or more angles of incidence, which may include one or more oblique angles and/or one or more normal angles. For example, as shown in FIG. 1, light from light source 16 is directed through optical element 18 and then lens 20 to specimen 14 at an oblique angle of incidence. The oblique angle of incidence may include any suitable oblique angle of incidence, which may vary depending on, for instance, characteristics of the specimen and the process being performed on the specimen.

The illumination subsystem may be configured to direct the light to the specimen at different angles of incidence at different times. For example, the imaging subsystem may be configured to alter one or more characteristics of one or more elements of the illumination subsystem such that the light can be directed to the specimen at an angle of incidence that is different than that shown in FIG. 1. In one such example, the imaging subsystem may be configured to move light source 16, optical element 18, and lens 20 such that the light is directed to the specimen at a different oblique angle of incidence or a normal (or near normal) angle of incidence.

In some instances, the imaging subsystem may be configured to direct light to the specimen at more than one angle of incidence at the same time. For example, the illumination subsystem may include more than one illumination channel, one of the illumination channels may include light source 16, optical element 18, and lens 20 as shown in FIG. 1 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen at different angles of incidence may be different such that light resulting from illumination of the specimen at the different angles of incidence can be discriminated from each other at the detector(s).

In another instance, the illumination subsystem may include only one light source (e.g., source 16 shown in FIG. 1) and light from the light source may be separated into different optical paths (e.g., based on wavelength, polarization, etc.) by one or more optical elements (not shown) of the illumination subsystem. Light in each of the different optical paths may then be directed to the specimen. Multiple illumination channels may be configured to direct light to the specimen at the same time or at different times (e.g., when different illumination channels are used to sequentially illuminate the specimen). In another instance, the same illumination channel may be configured to direct light to the specimen with different characteristics at different times. For example, optical element 18 may be configured as a spectral filter and the properties of the spectral filter can be changed in a variety of different ways (e.g., by swapping out one spectral filter with another) such that different wavelengths of light can be directed to the specimen at different times. The illumination subsystem may have any other suitable configuration known in the art for directing light having different or the same characteristics to the specimen at different or the same angles of incidence sequentially or simultaneously.

Light source 16 may include a broadband plasma (BBP) light source. In this manner, the light generated by the light source and directed to the specimen may include broadband light. However, the light source may include any other suitable light source such as any suitable laser known in the art configured to generate light at any suitable wavelength(s). The laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused onto specimen 14 by lens 20. Although lens 20 is shown in FIG. 1 as a single refractive optical element, in practice, lens 20 may include a number of refractive and/or reflective optical elements that in combination focus the light from the optical element to the specimen. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the system may be configured to alter one or more of the elements of the illumination subsystem based on the type of illumination to be used for imaging.

The imaging subsystem may also include a scanning subsystem configured to change the position on the specimen to which the light is directed and from which the light is detected and possibly to cause the light to be scanned over the specimen. For example, the imaging subsystem may include stage 22 on which specimen 14 is disposed during imaging. The scanning subsystem may include any suitable mechanical and/or robotic assembly (that includes stage 22) that can be configured to move the specimen such that the light can be directed to and detected from different positions on the specimen. In addition, or alternatively, the imaging subsystem may be configured such that one or more optical elements of the imaging subsystem perform some scanning of the light over the specimen such that the light can be directed to and detected from different positions on the specimen. In instances in which the light is scanned over the specimen, the light may be scanned over the specimen in any suitable fashion such as in a serpentine-like path or in a spiral path.

The imaging subsystem further includes one or more detection channels. At least one of the detection channel(s) includes a detector configured to detect light from the specimen due to illumination of the specimen by the imaging subsystem and to generate output responsive to the detected light. For example, the imaging subsystem shown in FIG. 1 includes two detection channels, one formed by collector 24, element 26, and detector 28 and another formed by collector 30, element 32, and detector 34. As shown in FIG. 1, the two detection channels are configured to collect and detect light at different angles of collection. In some instances, both detection channels are configured to detect scattered light, and the detection channels are configured to detect light that is scattered at different angles from the specimen. However, one or more of the detection channels may be configured to detect another type of light from the specimen (e.g., reflected light).

As further shown in FIG. 1, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 30, element 32, and detector 34 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 1 shows an embodiment of the imaging subsystem that includes two detection channels, the imaging subsystem may include a different number of detection channels (e.g., only one detection channel or two or more detection channels). In one such instance, the detection channel formed by collector 30, element 32, and detector 34 may form one side channel as described above, and the imaging subsystem may include an additional detection channel (not shown) formed as another side channel that is positioned on the opposite side of the plane of incidence. Therefore, the imaging subsystem may include the detection channel that includes collector 24, element 26, and detector 28 and that is centered in the plane of incidence and configured to collect and detect light at scattering angle(s) that are at or close to normal to the specimen surface. This detection channel may therefore be commonly referred to as a "top" channel, and the imaging subsystem may also include two or more side channels configured as described above. As such, the imaging subsystem may include at least three channels (i.e., one top channel and two side channels), and each of the at least three channels has its own collector, each of which is configured to collect light at different scattering angles than each of the other collectors.

As described further above, each of the detection channels included in the imaging subsystem may be configured to detect scattered light. Therefore, the imaging subsystem shown in FIG. 1 may be configured for dark field (DF) imaging of specimens. However, the imaging subsystem may also or alternatively include detection channel(s) that are configured for bright field (BF) imaging of specimens. In other words, the imaging subsystem may include at least one detection channel that is configured to detect light specularly reflected from the specimen. Therefore, the imaging subsystems described herein may be configured for only DF, only BF, or both DF and BF imaging. Although each of the collectors are shown in FIG. 1 as single refractive optical elements, each of the collectors may include one or more refractive optical elements and/or one or more reflective optical elements.

The one or more detection channels may include any suitable detectors known in the art such as photo-multiplier tubes (PMTs), charge coupled devices (CCDs), and time delay integration (TDI) cameras. The detectors may also include non-imaging detectors or imaging detectors. If the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the imaging subsystem may be signals or data, but not image signals or image data. In such instances, a computer subsystem such as computer subsystem 36 may be configured to generate images of the specimen from the non-imaging output of the detectors. However, in other instances, the detectors may be configured as imaging detectors that are configured to generate imaging signals or image data. Therefore, the imaging subsystem may be configured to generate images in a number of ways.

It is noted that FIG. 1 is provided herein to generally illustrate a configuration of an imaging subsystem that may be included in the system embodiments described herein. Obviously, the imaging subsystem configuration described herein may be altered to optimize the performance of the imaging subsystem as is normally performed when designing a commercial imaging system. In addition, the systems described herein may be implemented using an existing system (e.g., by adding functionality described herein to an existing inspection system) such as the 29xx/39xx series of tools that are commercially available from KLA Corp., Milpitas, Calif. For some such systems, the methods described herein may be provided as optional functionality of the system (e.g., in addition to other functionality of the system). Alternatively, the system described herein may be designed "from scratch" to provide a completely new system.

Computer subsystem 36 may be coupled to the detectors of the imaging subsystem in any suitable manner (e.g., via one or more transmission media, which may include "wired" and/or "wireless" transmission media) such that the computer subsystem can receive the output generated by the detectors. Computer subsystem 36 may be configured to perform a number of functions with or without the output of the detectors including the steps and functions described further herein. As such, the steps described herein may be performed "on-tool," by a computer subsystem that is coupled to or part of an imaging subsystem. In addition, or alternatively, computer system(s) 102 may perform one or more of the steps described herein. Therefore, one or more of the steps described herein may be performed "off-tool,"

by a computer system that is not directly coupled to an imaging subsystem. Computer subsystem 36 and computer system(s) 102 may be further configured as described herein.

Computer subsystem 36 (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, then the different computer subsystems may be coupled to each other such that images, data, information, instructions, etc. can be sent between the computer subsystems. For example, computer subsystem 36 may be coupled to computer system(s) 102 as shown by the dashed line in FIG. 1 by any suitable transmission media, which may include any suitable wired and/or wireless transmission media known in the art. Two or more of such computer subsystems may also be effectively coupled by a shared computer-readable storage medium (not shown).

Although the imaging subsystem is described above as being an optical or light-based imaging subsystem, in another embodiment, the imaging subsystem is configured as an electron-based imaging subsystem. In this manner, the specimen images described herein may be generated by an electron-based imaging subsystem. In an electron beam imaging subsystem, the energy directed to the specimen includes electrons, and the energy detected from the specimen includes electrons. In one such embodiment shown in FIG. 1a, the imaging subsystem includes electron column 122, and the system includes computer subsystem 124 coupled to the imaging subsystem. Computer subsystem 124 may be configured as described above. In addition, such an imaging subsystem may be coupled to another one or more computer systems in the same manner described above and shown in FIG. 1.

Figure 1A:
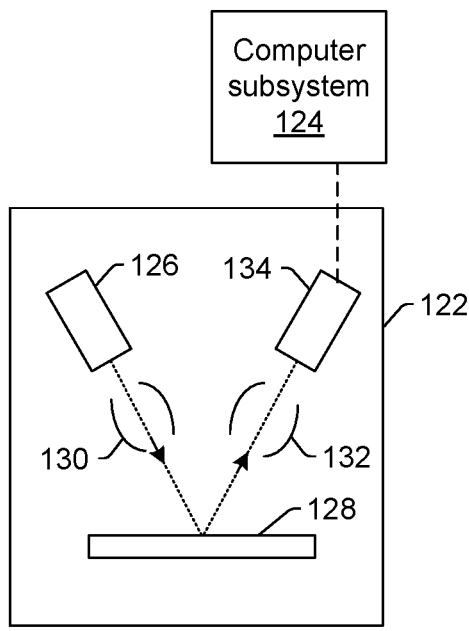

As also shown in FIG. 1a, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 1a as being configured such that the electrons are directed to the specimen at an oblique angle of incidence and are scattered from the specimen at another oblique angle, the electron beam may be directed to and scattered from the specimen at any suitable angles. In addition, the electron beam imaging subsystem may be configured to use multiple modes to generate output for the specimen as described further herein (e.g., with different illumination angles, collection angles, etc.). The multiple modes of the electron beam imaging subsystem may be different in any output generation parameters of the imaging subsystem.

Computer subsystem 124 may be coupled to detector 134 as described above. The detector may detect electrons returned from the surface of the specimen thereby forming electron beam images of (or other output for) the specimen. The electron beam images may include any suitable electron beam images. Computer subsystem 124 may be configured to detect events on the specimen using output generated by detector 134, which may be performed as described further herein. Computer subsystem 124 may be configured to perform any additional step(s) described herein. A system that includes the imaging subsystem shown in FIG. 1a may be further configured as described herein.

It is noted that FIG. 1a is provided herein to generally illustrate a configuration of an electron beam imaging subsystem that may be included in the embodiments described herein. As with the optical imaging subsystem described above, the electron beam imaging subsystem configuration described herein may be altered to optimize the performance of the imaging subsystem as is normally performed when designing a commercial system. In addition, the systems described herein may be implemented using an existing system (e.g., by adding functionality described herein to an existing system) such as tools that are commercially available from KLA. For some such systems, the methods described herein may be provided as optional functionality of the system (e.g., in addition to other functionality of the system). Alternatively, the system described herein may be designed "from scratch" to provide a completely new system.

Although the imaging subsystem is described above as being a light or electron beam imaging subsystem, the imaging subsystem may be an ion beam imaging subsystem. Such an imaging subsystem may be configured as shown in FIG. 1a except that the electron beam source may be replaced with any suitable ion beam source known in the art. In addition, the imaging subsystem may include any other suitable ion beam imaging system such as those included in commercially available focused ion beam (FIB) systems, helium ion microscopy (HIM) systems, and secondary ion mass spectroscopy (SIMS) systems.

As further noted above, the imaging subsystem may be configured to have multiple modes. In general, a "mode" is defined by the values of parameters of the imaging subsystem used to generate output for the specimen. Therefore, modes that are different may be different in the values for at least one of the imaging parameters of the imaging subsystem (other than position on the specimen at which the output is generated). For example, for a light-based imaging subsystem, different modes may use different wavelengths of light. The modes may be different in the wavelengths of light directed to the specimen as described further herein (e.g., by using different light sources, different spectral filters, etc. for different modes). In another embodiment, different modes may use different illumination channels. For example, as noted above, the imaging subsystem may include more than one illumination channel. As such, different illumination channels may be used for different modes.

The multiple modes may also be different in illumination and/or collection/detection. For example, as described further above, the imaging subsystem may include multiple detectors. Therefore, one of the detectors may be used for one mode and another of the detectors may be used for another mode. Furthermore, the modes may be different from each other in more than one way described herein (e.g., different modes may have one or more different illumination parameters and one or more different detection parameters). In addition, the multiple modes may be different in perspective, meaning having either or both of different angles of incidence and angles of collection, which are achievable as described further above. The imaging subsystem may be configured to scan the specimen with the different modes in the same scan or different scans, e.g., depending on the capability of using multiple modes to scan the specimen at the same time.

In some instances, the systems described herein may be configured as inspection systems. However, the systems described herein may be configured as another type of semiconductor-related quality control type system such as a defect review system and a metrology system. For example, the embodiments of the imaging subsystems described herein and shown in FIGS. 1 and 1a may be modified in one or more parameters to provide different imaging capability depending on the application for which they will be used. In one embodiment, the imaging subsystem is configured as an electron beam defect review subsystem. For example, the imaging subsystem shown in FIG. 1a may be configured to have a higher resolution if it is to be used for defect review or metrology rather than for inspection. In other words, the embodiments of the imaging subsystem shown in FIGS. 1 and 1a describe some general and various configurations for an imaging subsystem that can be tailored in a number of manners that will be obvious to one skilled in the art to produce imaging subsystems having different imaging capabilities that are more or less suitable for different applications.

As noted above, the imaging subsystem may be configured for directing energy (e.g., light, electrons) to and/or scanning energy over a physical version of the specimen thereby generating actual images for the physical version of the specimen. In this manner, the imaging subsystem may be configured as an "actual" imaging system, rather than a "virtual" system. However, a storage medium (not shown) and computer subsystem(s) 102 shown in FIG. 1 may be configured as a "virtual" system. In particular, the storage medium and the computer subsystem(s) are not part of imaging subsystem 100 and do not have any capability for handling the physical version of the specimen but may be configured as a virtual inspector that performs inspection-like functions, a virtual metrology system that performs metrology-like functions, a virtual defect review tool that performs defect review-like functions, etc. using stored detector output. Systems and methods configured as "virtual" systems are described in commonly assigned U.S. Pat. No. 8,126,255 issued on Feb. 28, 2012 to Bhaskar et al., U.S. Pat. No. 9,222,895 issued on Dec. 29, 2015 to Duffy et al., and U.S. Pat. No. 9,816,939 issued on Nov. 14, 2017 to Duffy et al., which are incorporated by reference as if fully set forth herein. The embodiments described herein may be further configured as described in these patents. For example, a computer subsystem described herein may be further configured as described in these patents.

The system includes a computer subsystem, which may include any configuration of any of the computer subsystem(s) or system(s) described above, and one or more components executed by the computer subsystem. For example, as shown in FIG. 1, the system may include computer subsystem 36 and one or more components 104 executed by the computer subsystem. The one or more components may be executed by the computer subsystem as described further herein or in any other suitable manner known in the art. At least part of executing the one or more components may include inputting one or more inputs, such as images, data, etc., into the one or more components. The computer subsystem may be configured to input any images, data, etc. into the one or more components in any suitable manner.

The one or more components include semantic segmentation model 106 (also referred to herein as a semantic image segmentation model) configured for assigning labels to each of multiple pixels in an image responsive to what is represented in each of the multiple pixels. The image is an image of a specimen generated by an imaging subsystem. The image may include any of the images described herein generated by any of the imaging subsystems described herein. Semantic segmentation involves both segmentation and classification. The goal of semantic image segmentation is to label each pixel in an image with a corresponding class of what is being represented.

In one embodiment, the computer subsystem is configured for training the semantic segmentation model for the assigning with a training set that includes one or more patch images of one or more DOIs generated by the imaging subsystem and labels assigned to each of multiple pixels in the one or more patch images. For example, as shown in step 200 of FIG. 2, the computer subsystem may be configured to collect patch images of DOIs generated by the imaging subsystem, which may be performed as described above. In one such example, patch image 202 of a DOI, i.e., a "candidate image," may be generated by the imaging subsystem and collected by the computer subsystem. In this patch image, the darkest gray shapes are patterned features formed on the specimen and the lighter gray shapes are noise or nuisance signals in the image. The area in the image inside the dotted line (not part of the original image but added here for clarification purposes) corresponds to a defect detected in the patch image, which is a missing piece of the patterned feature above and below that area.

The computer subsystem may also use a thresholded difference image of a defect or mask image for annotation, as shown in step 206. The thresholded difference image or defect mask can be used as a segmentation map for training the semantic segmentation model. In one such example, annotated image 208 may be generated for patch image 202 by thresholding a difference image generated by subtracting a reference image from the patch image or by applying a defect mask to the patch image. Therefore, the thresholded difference image or masked image will show only the defect in the patch image. In this example, the dark gray shape in annotated image 208 may be an annotation that indicates which pixel(s) represent(s) a defect, and the remaining pixels, lacking any such annotation, may be thereby indicated as non-defective for training.

As shown in step 212, the computer subsystem may use candidate and annotated images to train the semantic image segmentation model to detect the defect in the patch images, which may be performed as described further herein. The computer subsystem may then use the trained semantic image segmentation model to perform defect detection on patch images, as shown in step 214. In other words, after the training done using the candidate and annotated images, the computer subsystem may input other specimen images into the semantic segmentation model, which may label pixels in the specimen images as defective or not thereby performing defect detection on the patch images.

As described above, therefore, the labels assigned to each of multiple pixels in the one or more patch images used for training may be contained in an annotated image in which pixels (having a 1:1 correspondence with the pixels in a specimen image) are labeled with what is contained in the specimen image. In addition, as shown in FIG. 2, the annotated image may contain only two kinds of labels, one (a label represented by the dark gray square in the annotated image) for the DOI and another (a label represented by the white areas of the annotated image) for portions of the specimen image that do not include a DOI.

Figure 2:
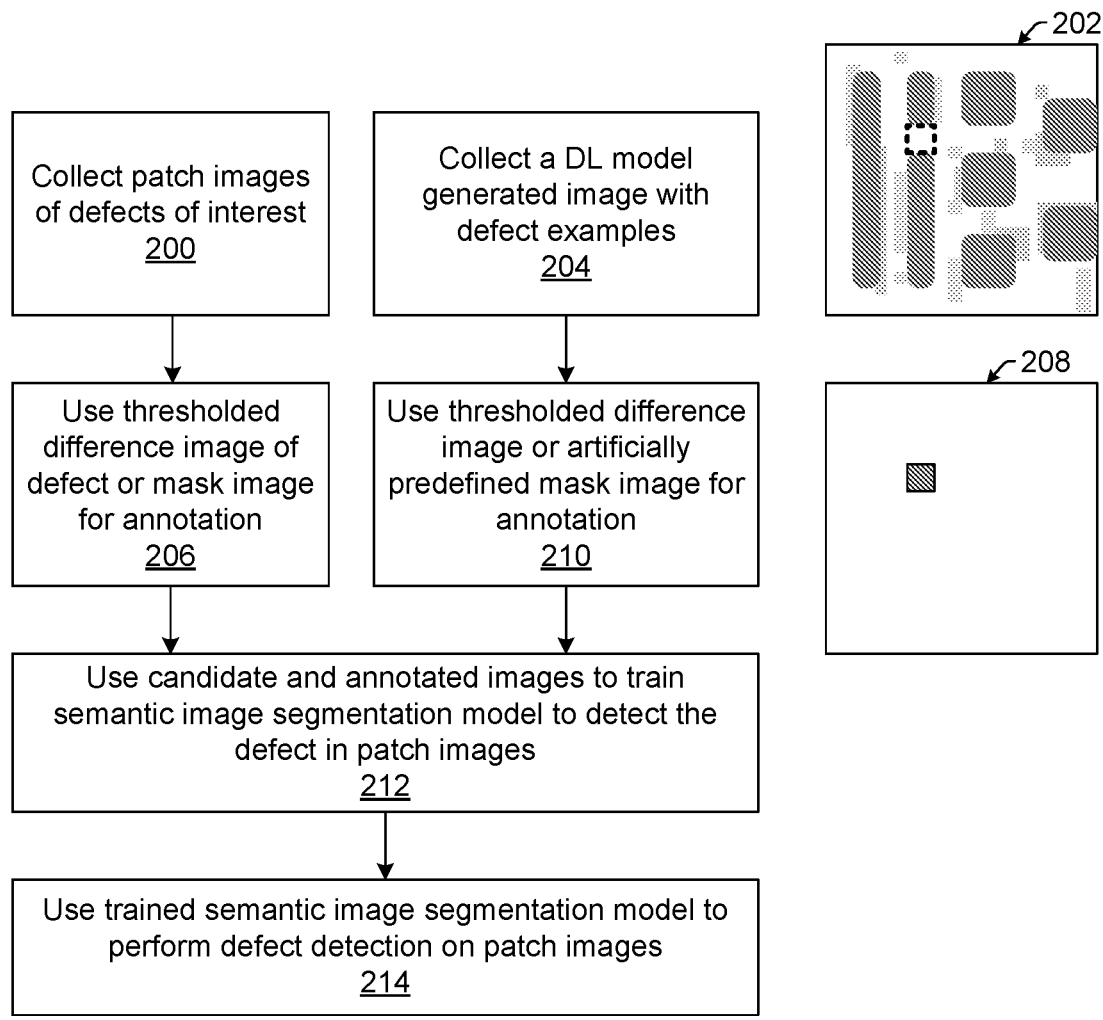
FIG. 2 is a flow chart illustrating steps that may be performed by the embodiments described herein.

However, the annotated image may be more complex than that shown in FIG. 2 and may include more than two labels such as first labels for the DOI, second labels for other patterned structures in the specimen image, and even third labels for portions of the specimen image that do not include a DOI or a patterned structure. Such an annotated image may be similar to the segmentation label maps shown in FIG. 4 and described further below. Different labels may be contained in a single annotated image, or more than one annotated image may be generated for a single specimen image.

Furthermore, although using an annotated image such as that shown in FIG. 2, in which the original specimen image is not present, may be advantageous in some respects that is not a requirement. For example, the labels used for training may be incorporated into, attached to, overlaid on, etc. the specimen image so that the training outputs also include the original specimen image. In addition, although the labels are described herein as possibly being included in an annotated image, thresholded difference image, or defect mask, the labels themselves do not have to be in any kind of image or schematic format for training. In one such example, a simple data structure containing the pixel IDs and their corresponding labels can be used for training the semantic segmentation model.

In another embodiment, the computer subsystem is configured for training the semantic segmentation model for the assigning with a training set that includes one or more patch images of one or more DOIs generated by a deep learning (DL) model and labels assigned to each of the multiple pixels in the one or more patch images. In this manner, if patch images of DOIs generated by an imaging subsystem are not available, a DL-based approach may be performed to create such images. For example, even if there are no defect examples at all, the computer subsystem may modify a design file for a specimen by introducing a defect in it, create the corresponding optical patch image and its annotated image, and train a semantic segmentation model with them.

As shown in step 204 of FIG. 2, the computer subsystem may collect a DL model generated image with defect examples. The DL model generated image may appear similar to patch image 202 shown in FIG. 2. Collecting the DL model generated image may include inputting design information for the specimen, modified to include an artificial defect, into the DL model thereby generating the simulated image for the artificial defect. However, collecting the DL model generated image may include acquiring the image from another method or system that generated the image using the DL model. The image(s) that are collected in step 204 may include any number of images for any number of different DOIs (which may be all of the same type or of different types) with any defect attributes (e.g., the same DOI types in different locations, the same DOI types with different defect attributes, etc.). Using DL model generated images for training the semantic image segmentation model may be advantageous because there can be many more possibilities for defects and defect attributes than may be found by scanning a physical specimen for the DOIs. As described further herein, such DL generated images may also be used for training in combination with actual specimen images generated by an imaging subsystem for a physical specimen thereby expanding the possibilities of the images and labels available for training.

The computer subsystem may also use a thresholded difference image or artificially predefined mask image for annotation, as shown in step 210. The thresholded difference image may be generated as described above using the DL generated image in place of the specimen image. The artificially predefined defect mask image may also be generated as described above using the DL generated image or may be generated without the DL generated image using only information about the artificial defect created in the design file. The thresholded difference image or artificially predefined mask image can be used as a segmentation map for training the semantic segmentation model. The thresholded difference image or artificially predefined mask image may appear similar to annotated image 208 shown in FIG. 2. The annotated image may be further configured as described above. As shown in step 212, the computer subsystem may use candidate and annotated images to train the semantic image segmentation model to detect the defect in the patch images, which may be performed as described further herein. The computer subsystem may then use the trained semantic image segmentation model to perform defect detection on patch images, as shown in step 214, which may be performed as described further herein.

In one such embodiment, the DL model includes a generative adversarial network (GAN). In this manner, if not enough or none of the patch images of the defects generated by an imaging subsystem are available for training, a GAN-based approach may be used to create such images. A GAN can be generally defined as a deep neural network architecture that includes two networks pitted against each other. Additional description of the general architecture and configuration of GANs and conditional GANs (cGANs) can be found in U.S. Patent Application Publication No. 2021/0272273 by Brauer published Sep. 2, 2021, U.S. patent application Ser. No. 17/308,878 by Brauer et al. filed May 5, 2021, "Generative Adversarial Nets," Goodfellow et al., arXiv:1406.2661, Jun. 10, 2014, 9 pages, "Semi-supervised Learning with Deep Generative Models," Kingma et al., NIPS 2014, Oct. 31, 2014, pp. 1-9, "Conditional Generative Adversarial Nets," Mirza et al., arXiv:1411.1784, Nov. 6, 2014, 7 pages, "Adversarial Autoencoders," Makhzani et al., arXiv:1511.05644v2, May 25, 2016, 16 pages, and "Image-to-Image Translation with Conditional Adversarial Networks," Isola et al., arXiv:1611.07004v2, Nov. 22, 2017, 17 pages, which are incorporated by reference as if fully set forth herein. The embodiments described herein may be further configured as described in these references.

In another such embodiment, the training set also includes one or more additional patch images of the one or more DOIs or one or more additional DOIs generated by the imaging subsystem and additional labels assigned to each of multiple pixels in the one or more additional patch images. In this manner, the training may be performed as described above with either imaging subsystem generated candidate patch images or DL generated DOI images. However, the training may also be performed with both kinds of images. For example, in some instances, there may be some imaging subsystem DOI images available, but not enough for training purposes. Those imaging subsystem images may be retained for training purposes and augmented with DL or GAN generated defect images. In another example, there may be enough imaging subsystem images available for a first DOI type, but no or not enough imaging subsystem images available for a second DOI type for training purposes. In this example, the imaging subsystem DOI images may be retained for training purposes and augmented with DL or GAN generated DOI images for the second DOI type. As such, as shown in FIG. 2, candidate and annotated images generated from both an imaging subsystem and a DL or GAN model may be input to step 212 and used for training the semantic image segmentation model. The computer subsystem may then use the trained semantic image segmentation model to perform defect detection on patch images, as shown in step 214.

Although FIG. 2 describes and shows steps that may be performed for an inspection application, these same steps may be performed in a similar manner for other applications described herein like metrology and defect review. In such instances, the candidate and annotated images may be different from those shown in FIG. 2 and may be replaced with suitable images generated by another imaging subsystem such as that included in a metrology or defect review tool. In addition, the output of the trained semantic image segmentation model may be different and may vary depending on the training and the labels assigned to the images used for training. For example, instead of performing defect detection on patch images as shown in step 214, the trained semantic image segmentation model may be configured to perform metrology or a step used to perform metrology (like patterned structure identification) or to perform defect redetection or another step used to perform defect review (like determining attributes of a redetected defect).

The semantic segmentation model may or may not be trained by the computer subsystem and/or one of the component(s) executed by the computer subsystem. For example, another method or system may train the semantic segmentation model, which then may be stored for use as the component(s) executed by the computer subsystem. In either case, the training may include inputting the training inputs into the semantic segmentation model and altering one or more parameters of the semantic segmentation model until the output produced by the semantic segmentation model matches (or substantially matches) the training outputs. Training may include altering any one or more trainable parameters of the semantic segmentation model. The one or more parameters of the semantic segmentation model that are trained may include one or more weights for any layer of the semantic segmentation model that has trainable weights. In one such example, the weights may include weights for convolution layers but not pooling layers.

In one embodiment, the semantic segmentation model is configured for assigning a first of the labels to one or more of the multiple pixels in which a defect is represented and a second of the labels to one or more other of the multiple pixels in which the defect is not represented, and the assigning is performed without a reference image for the specimen. The embodiments described herein may, therefore, be configured for performing defect detection without a reference image. In this manner, the embodiments described herein may be configured for single image detection (SID) in which the only image input to the defect detection is the specimen test image.

Figure 3:
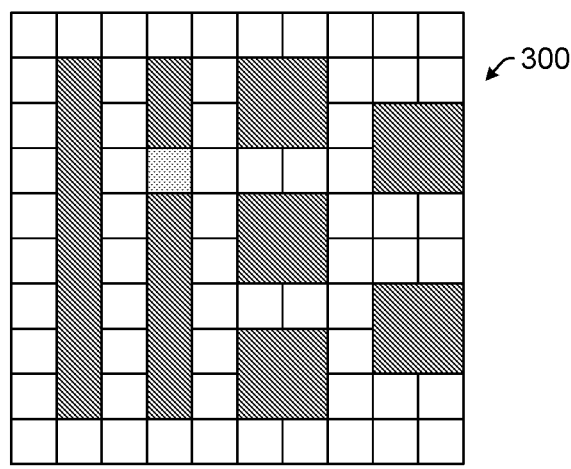

In the case of defect detection, the user is mainly interested in what is a defect and what is the background (or not a defect). In one such example, FIG. 3 shows sketch 300 corresponding to candidate patch image 202 shown in FIG. 2 with a pixel grid overlaid thereon. In this sketch, the darkest gray pixels indicate patterned features in the patch image, and the lightest gray pixel indicates a defect in the image. A semantic image segmentation model configured as described herein may generate semantic label map 302 shown in FIG. 3 of the DOI in which only the pixel representing the defect is labeled with a 1 and the pixels representing everything else are labeled with a 0. Therefore, one label is used for the pixel in which a defect is represented, and another, different label is used for the rest of the pixels. The semantic image segmentation model may also, but not necessarily, generate semantic label map 304 of everything else in which all of the pixels representing everything that is not a defect are labeled with a 2 and the pixel representing the defect is labeled with a 0. In this manner, the pixels labeled with a 2 represent different things (patterned structures and unpatterned areas surrounding the patterned structures), which are alike in that they do not represent a defect on the specimen.

A user may sometimes be interested in if the defect is located on a design polygon or not. This information can be generated using a design-based alignment approach, but the semantic segmentation model described herein may be configured for performing this task.

In one such embodiment, the semantic segmentation model is configured for assigning a first of the labels to one or more of the multiple pixels in which a defect is represented and a second of the labels to one or more additional of the multiple pixels in which one or more structures on the specimen are represented. Therefore, different things represented in the image may be assigned different labels. For example, for sketch 300 shown in FIG. 3 corresponding to candidate patch image 202 shown in FIG. 2 with a pixel grid overlaid thereon, a semantic image segmentation model configured as described herein may generate semantic label map 400 of the DOI shown in FIG. 4 in which only the pixel representing the defect is labeled with a 1 and the pixels representing everything else are labeled with a 0. Therefore, one label is used for the pixel in which a defect is represented, and another, different label is used for the rest of the pixels. The semantic image segmentation model may also generate semantic label map 402 of background polygons in which all of the pixels that represent background polygons (patterned structures formed on the same layer as the defect) are labeled with a 2 and the pixels representing everything else are labeled with a 0.

In one such embodiment, the semantic segmentation model is configured for assigning a third of the labels to one or more further of the multiple pixels in which one or more additional structures on the specimen formed under the one or more structures are represented. For example, the semantic image segmentation model may generate semantic label map 404 of a pre-layer in which all of the pixels that represent background polygons (i.e., pixels that represent neither a defect nor a polygon on the layer being inspected) are labeled with a 3 and the pixels representing everything else are labeled with a 0. In this manner, the semantic segmentation model may generate semantic label maps of DOI and differentiated background patterns (background patterns on different layers of the specimen or a pattern on a current layer of the specimen and the unpatterned portions of the current layer) for patch images.

In a further embodiment, the semantic segmentation model is configured for assigning a first of the labels to one or more of the multiple pixels in which one or more instances of a first type of a DOI are represented and one or more other of the labels to one or more other of the multiple pixels in which the one or more instances of the first type of the DOI are not represented. For example, the semantic segmentation only assigns one code per class, e.g., the DOI is 1, which is sufficient for the applications described herein even if there is more than one DOI per image. In this manner, unlike semantic label maps 302 and 400 shown in FIGS. 3 and 4, respectively, in which there is only one pixel labeled as representing a DOI, the semantic label maps may have more than one pixel labeled as representing a DOI and assigned the same label. These so-labeled pixels may be adjacent to one another in the map or may be spaced from each other in the map depending on the locations of the DOI instances in the image. Such maps may otherwise be generated as described further herein.

In some embodiments, the semantic segmentation model is configured for assigning a first of the labels to one or more of the multiple pixels in which a first DOI is represented, a second of the labels to one or more additional of the multiple pixels in which a second DOI is represented, and one or more other of the labels to one or more other of the multiple pixels in which the first and second DOIs are not represented, and the first and second DOIs are different types of DOIs. For example, if a user wants to distinguish between different DOIs of the same or different types, this would be called instance segmentation. In one such example, the first of the labels assigned to any of the pixels in which an instance of a first DOI type is represented may be 1, the second of the labels assigned to any of the pixels in which an instance of a second DOI type is represented may be 2, and the labels assigned to everything else may be 0 (or different labels may be used for different background polygons on one or more layers of the specimen). In such instances, one semantic label map may be generated showing only the labels for the instance(s) of the first DOI type, with all other pixels labeled 0, another semantic label map may be generated showing only the labels for the instance(s) of the second DOI type, with all other pixels labeled 0, and so on. This same type of labeling may also be used for multiple instances of the same DOI type if that is preferred over using the same labels for multiple instances of the same DOI type as described above.

The results of the assigning labels step may include any one or more of the semantic label maps described above and shown in FIGS. 3 and 4, which may be useful for a number of reasons, but this is also not necessary. For example, the labels and identifying information for the pixels they are assigned to may be represented and stored in any suitable data structure known in the art and does not necessarily require generating some visual representation of the labels and the pixels to which they were assigned.

Figure 5:
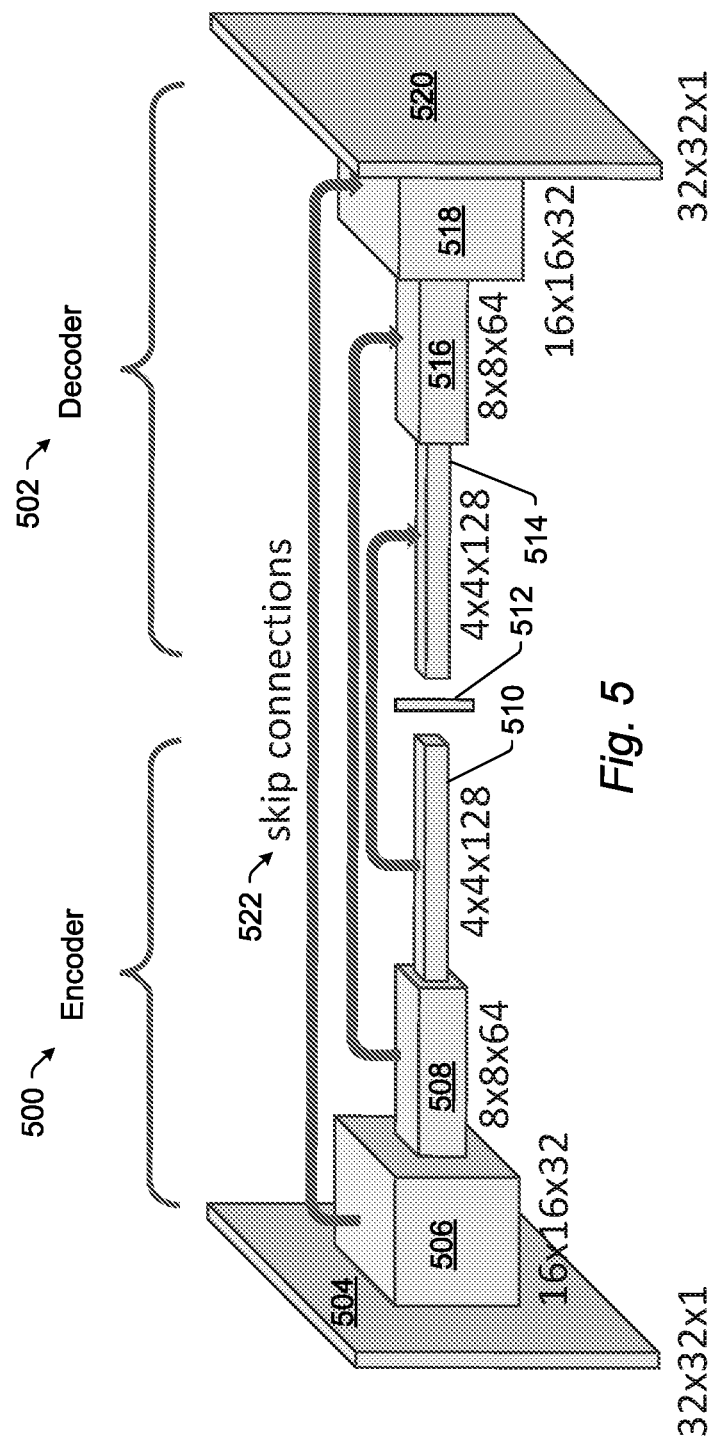
FIG. 5 is a schematic diagram illustrating one embodiment of an architecture that may be used for a semantic segmentation model configured as described herein.

One possible approach for semantic image segmentation models is to follow an encoder/decoder structure configured for sampling the spatial resolution of the input, developing low-resolution feature mappings (low-resolution in the sense that they are lower resolution than the specimen image) which are learned to be highly efficient at discriminating between classes, and upsampling the feature representations into a full-resolution segmentation map (full-resolution in the sense that it is the same resolution as the specimen image). One example of such a structure is shown in FIG. 5. While this so-called U-Net structure is described in greater detail herein, it should be noted that any other suitable network configuration known in the art can be used for the semantic segmentation described herein.

As shown in FIG. 5, the generator may include encoder 500 and decoder 502. Each of the blocks 506, 508, and 510 shown in encoder 500 represent an example of final output layer size after repeated convolution, batch normalization, and rectified linear unit (ReLU) activation and applying max pooling in the end of each section. Although encoder 500 is shown in FIG. 5 as including 3 blocks, the encoder may include any suitable number of blocks, which may be determined in any suitable manner known in the art. In addition, each of the blocks, convolution layer(s), batch normalization layer(s), ReLU layer(s), and pooling layer(s) may have any suitable configuration known in the art. Input 504, which is in the embodiments described herein a specimen image, may be input into block 506, whose output may be input to block 508, and so on. The encoder may generate feature layer 512.

The decoder may also include multiple blocks that perform different functions on feature layer 512 input to the decoder. Each of blocks 514, 516, and 518 in the decoder represent an example of final output layer size after repeating upsampling (transposed convolution) and ReLU activation. Although decoder 502 is shown in FIG. 5 as including 3 blocks, the decoder may include any suitable number of blocks, which may be determined in any suitable manner known in the art. Each of the blocks and upsampling and ReLU layer(s) included in the decoder may have any suitable configuration known in the art. Feature layer 512 generated by the encoder may be input to block 514, whose output may be input to block 516, and so on. Output 520 of the decoder may be any of the semantic label maps described herein.

In some instances, the semantic segmentation model may include skip connections 522 between corresponding blocks in the encoder and decoder, e.g., between blocks 506 and 518, between blocks 508 and 516, and between blocks 510 and 514. Connections can be skipped to transfer low-level information that has been learned between the blocks. The skip connections may have any suitable configuration determined in any suitable manner known in the art. The numbers below the input and output in FIG. 5 indicate the size of the input and output, respectively. The numbers below the blocks in the encoder indicate the size of the outputs of the blocks, and the numbers below the blocks in the decoder indicate the size of the inputs to each of the blocks. All of the numbers below the input, output, and blocks in FIG. 5 are intended as non-limiting examples, which may vary depending on the size of the input images and the configurations of the layers.

In one embodiment, the labels assigned to each of the multiple pixels are selected from a predefined set of labels learned by the semantic segmentation model during training of the semantic segmentation model. Semantic image segmentation is the task of classifying each pixel in an image from a predefined set of classes. Thus, unlike some defect detection that involves looking for any and all possible differences between images and identifying them as candidate or potential defects, the semantic image segmentation described herein essentially searches an image for an already learned defect. In other words, the semantic image segmentation model is not searching for any differences between the specimen image and some known good image and then examining those differences to determine which ones represent defects but is searching the specimen image for some previously learned defect(s).

Performing defect detection in this manner can have a variety of advantages including those described below for repeater defect detection, but also for reducing nuisance detection. For example, when an image is examined for any differences between it and a known good image, many differences that are not necessarily defects or DOIs may be detected as potential defects, which then have to be filtered for nuisance or noise. In many instances such as when an inspection system is operating at or near its performance limitations or for certain kinds of inspection processes, the level of nuisance or noise detection can actually prohibit the inspection by rendering the data handling near impossible or make the data handling (e.g., separation of nuisance from defects) so difficult that it hinders inspection. In contrast, because the embodiments described herein are not searching for each and every difference between two images and then processing those differences for defect detection, the embodiments described herein can perform a kind of targeted defect detection in which the semantic segmentation model searches specimen images for only certain kinds of defects and assigns one or more predefined labels to the defects that are learned via training performed with predefined labels assigned to preexisting defect examples. In this manner, when the semantic segmentation model is not trained to find nuisances, it will not find them in specimen images (or at least find far, far fewer of them than most inspection processes). As such, the embodiments described herein provide significantly reduced nuisance detection compared to many currently used inspection processes, which allows semiconductor manufacturers to make more reliable process decisions and thus not waste money making incorrect processing decisions.

At a lower level, the neurons contain information for a relatively small region of the image, whereas at a higher level the neurons contain information for a relatively large region of the image. Thus, as we add more layers, the size of the image keeps on decreasing and the number of channels keeps on increasing. The down-sampling is done by the pooling layers.

In some embodiments, the semantic segmentation model does not include any fully connected layers. For the case of image classification, the spatial tensor from the convolution layers is mapped to a fixed length vector. To do that, fully connected layers are used, which destroy all the spatial information. For the task of image segmentation, the spatial information must be retained, hence no fully connected layers are used. When a network does not include any fully connected layers, it is called a fully convolutional network. In one such embodiment, the computer subsystem is configured for setting up the semantic segmentation model by replacing the fully connected layer in a preexisting neural network with a group of convolutional layers thereby creating the semantic segmentation model. For example, the embodiments described herein may follow the general idea described in "Fully convolutional networks for semantic segmentation" by Long et al., CVPR2015, pp. 3431-3440, 2015, which is incorporated by reference as if fully set forth herein, to replace a fully connected layer of a neural network by a convolutional layer. The embodiments described herein may be further configured as described in this reference.

The convolutional layers coupled with down sampling layers produce a low-resolution tensor containing the high-level information. Taking the low-resolution spatial tensor, which contains high-level information, we have to produce high-resolution segmentation outputs (high-resolution in the sense that they have the same resolution as the input specimen image). To do that, more convolution layers are added and coupled with up sampling layers which increase the size of the spatial tensor. As we increase the resolution, we decrease the number of channels as we are getting back to the low-level information. This is called an encoder-decoder structure, where the layers which down sample the input are part of the encoder and the layers that up sample are part of the decoder.

Filter upsampling amounts to inserting holes ("trous" in French) between nonzero filter taps. This technique has a long history in signal processing, originally developed for the efficient computation of the undecimated wavelet transform in a scheme also known as "algorithme a trous." Hence the term atrous convolution is commonly used as a shorthand for convolution with upsampled filters. Various flavors of this idea have been used before in the context of deep convolution neural networks (DCNNs). In practice, the full resolution feature maps may be recovered by a combination of atrous convolution, which computes feature maps more densely, followed by simple bilinear interpolation of the feature responses to the original image size. This scheme offers a simple yet powerful alternative to using deconvolutional layers in dense prediction tasks. Compared to regular convolution with larger filters, atrous convolution allows effectively enlarging the field of view of filters without increasing the number of parameters or the amount of computations. This embodiment of the semantic segmentation model may further be configured as described in "DeepLab: Semantic Image Segmentation with Deep Convolutional Nets, Atrous Convolution, and Fully Connected CRFs," by Chen et al., arXiv: 1606.00915v2, Jun. 2, 2016, 14 pages, which is incorporated by reference as if fully set forth herein.

When the model is trained for the task of semantic segmentation, the encoder outputs a tensor containing information about the objects and its shape and size. The decoder takes this information and produces the segmentation. Skip connections from earlier layers in the network may be used to provide necessary details to reconstruct accurate shapes for segmentation boundaries.

In addition to the above-mentioned approach, we can further augment the input channels with additional frames, e.g., by using a design-based input channel or a rendered version of the design. Additional output branches could also be added to further help the encoder.

The computer subsystem is configured for determining information for the specimen from the assigned labels and without a reference image for the specimen. The information determined and the manner in which the assigned labels are used may vary depending on the process being performed on the specimen. The determining information step may be performed by the computer subsystem using an algorithm, which may be part of the one or more components executed by the computer subsystem or may be separate from those components.

In some embodiments, the information determined for the specimen includes predicted defect locations on the specimen. The predicted defect locations may be determined in an inspection process in which a relatively large area on the specimen is scanned by the imaging subsystem and then images generated by such scanning are inspected for potential defects by the semantic segmentation model. The computer subsystem may then determine the information by examining semantic label map(s) generated by the semantic segmentation model for any labels assigned to any of the pixels by the semantic segmentation model that indicate the presence of a defect or defects of the same or different types. The computer subsystem may also determine information for the pixels that have been assigned a label indicating a defect is represented in the pixels. That information may be generated using the labels, the semantic segmentation map, and the original specimen image, possibly in combination with other information described herein such as a design for the specimen. The information may include, for example, a type of defect detected, a position of a detected defect with respect to one or more of the specimen image, the specimen, the imaging subsystem, and a design for the defect, and any other information generated for the defect by the semantic segmentation model or the computer subsystem. Such information may be output and stored by the computer subsystem as described further herein.

In another embodiment, the information determined for the specimen includes predicted repeater defect locations on the specimen. In this manner, the embodiments described herein may be used for print check applications. "Print check" is defined herein as a type of mask inspection that involves printing the mask on a wafer, inspecting the wafer, and identifying defects on the mask based on the wafer inspection results. Print check may be used to identify reticle repeaters for extreme ultraviolet (EUV) mask monitoring, which may be performed to routinely or regularly check EUV masks released to production for possible contamination. Print check can be used for both single die reticles (SDR) and multi-die reticles (MDR). For array region print check, repeater in array (MA) based on cell-to-cell comparison may be used to find reticle repeaters. The embodiments described herein may also be used for detecting any other kinds of repeater defects that may be present on the specimen.

The embodiments described herein can advantageously detect repeater defects on a specimen that may be difficult to detect using other inspection methods and systems because the embodiments described herein do not need to use a reference image for defect detection. In particular, because the embodiments described herein can perform SID, any defect signals in the image used for defect detection will not be canceled out by reference image subtraction as can be the case when defects are present in the same location in multiple dies, cells, etc. on the specimen.

In an additional embodiment, the information determined for the specimen includes one or more defect attributes of one or more predicted defect locations on the specimen. For example, the embodiments described herein may be configured for determining defect attributes based on the semantic segmentation result. The defect attributes may include any suitable defect attributes, e.g., classification, size, shape, etc., (other than reported defect location) that can be determined from the semantic segmentation result and/or its alignment to the original specimen image, design data, etc. The defect attributes may be determined by the computer subsystem using any suitable method or system known in the art.

In general, determining the information may include generating one or more inspection-like results for the specimen. Essentially, therefore, the determining information step may have multiple output channels, each for a different type of information. The outputs from multiple channels may then be combined into a single inspection results file (e.g., a KLARF file generated by some KLA inspection tools) for the specimen. In this manner, for any one location on the specimen, there may be multiple types of information in the inspection results file.

In a similar manner, the process may be a defect review process. Unlike inspection processes, a defect review process generally revisits discrete locations on a specimen at which a defect has been detected. An imaging subsystem configured for defect review may generate specimen images as described herein, which may be input to the semantic segmentation model as described herein. The semantic segmentation model may be trained and configured for assigning labels to each of multiple pixels in the image responsive to what is represented in each of the multiple pixels, e.g., a defect, a patterned structure, an unpatterned area, one or more attributes of the defect like a defect shape, dimensions, roughness, background pattern information, etc. and/or a defect classification (e.g., a bridging type defect, a missing feature defect, etc.). For defect review applications, the computer subsystem may also be configured for using any suitable defect review method or algorithm used on any suitable defect review tool to determine information for the defect or the specimen from the results generated by the semantic segmentation model. While the various inputs and outputs may be different for defect review use cases compared to inspection, the same semantic segmentation model may be used for both defect review and inspection (after application-appropriate training). The semantic segmentation model may otherwise be trained and configured as described above.

As described above, in some embodiments, the imaging subsystem may be configured for metrology of the specimen. In one such embodiment, determining the information includes determining one or more characteristics of a specimen structure in an input image. For example, the semantic segmentation model described herein may be configured for assigning labels to pixels in a specimen image that can then be used to determine metrology information for the specimen. The metrology information may include any metrology information of interest, which may vary depending on the structures on the specimen. Examples of such metrology information include, but are not limited to, critical dimensions (CDs) such as line width and other dimensions of the specimen structures. The specimen images may include any images generated by any metrology tool, which may have a configuration such as that described herein or any other suitable configuration known in the art. In this manner, the embodiments described herein may advantageously use a specimen image generated by a metrology tool for predicting metrology information for the specimen and any one or more specimen structures included in the input image. For metrology applications, the computer subsystem may also be configured for using any suitable metrology method or algorithm used on any suitable metrology tool to determine information for the specimen from the results generated by the semantic segmentation model. While the various inputs and outputs may be different for metrology use cases compared to inspection, the same semantic segmentation model may be used for both metrology and inspection (after application-appropriate training). The semantic segmentation model may otherwise be trained and configured as described above.

The computer subsystem may also be configured for generating results that include the determined information, which may include any of the results or information described herein. The results of determining the information may be generated by the computer subsystem in any suitable manner. All of the embodiments described herein may be configured for storing results of one or more steps of the embodiments in a computer-readable storage medium. The results may include any of the results described herein and may be stored in any manner known in the art. The results that include the determined information may have any suitable form or format such as a standard file type. The storage medium may include any storage medium described herein or any other suitable storage medium known in the art.

After the results have been stored, the results can be accessed in the storage medium and used by any of the method or system embodiments described herein, formatted for display to a user, used by another software module, method, or system, etc. to perform one or more functions for the specimen or another specimen of the same type. For example, results produced by the computer subsystem may include information for any defects detected on the specimen such as location, etc., of the bounding boxes of the detected defects, detection scores, information about defect classifications such as class labels or IDs, any defect attributes determined from any of the images, etc., predicted specimen structure measurements, dimensions, shapes, etc. or any such suitable information known in the art. That information may be used by the computer subsystem or another system or method for performing additional functions for the specimen and/or the detected defects such as sampling the defects for defect review or other analysis, determining a root cause of the defects, etc.

Such functions also include, but are not limited to, altering a process such as a fabrication process or step that was or will be performed on the specimen in a feedback or feedforward manner, etc. For example, the computer subsystem may be configured to determine one or more changes to a process that was performed on the specimen and/or a process that will be performed on the specimen based on the determined information. The changes to the process may include any suitable changes to one or more parameters of the process. In one such example, the computer subsystem preferably determines those changes such that the defects can be reduced or prevented on other specimens on which the revised process is performed, the defects can be corrected or eliminated on the specimen in another process performed on the specimen, the defects can be compensated for in another process performed on the specimen, etc. The computer subsystem may determine such changes in any suitable manner known in the art.

Those changes can then be sent to a semiconductor fabrication system (not shown) or a storage medium (not shown) accessible to both the computer subsystem and the semiconductor fabrication system. The semiconductor fabrication system may or may not be part of the system embodiments described herein. For example, the imaging subsystem and/or the computer subsystem described herein may be coupled to the semiconductor fabrication system, e.g., via one or more common elements such as a housing, a power supply, a specimen handling device or mechanism, etc. The semiconductor fabrication system may include any semiconductor fabrication system known in the art such as a lithography tool, an etch tool, a chemical-mechanical polishing (CMP) tool, a deposition tool, and the like.

The embodiments described herein have a number of advantages in addition to those already described. For example, even if there are no DOI examples at all, the embodiments described herein can modify a design clip by introducing a defect in it, create a corresponding optical patch image, and then train the semantic segmentation model with the created patch image. In another example, the embodiments described herein provide defect detection with no reference image needed which allows this technique to be used for print check use cases and other cases in which a suitable reference image is difficult to acquire.

Each of the embodiments of each of the systems described above may be combined together into one single embodiment.

Another embodiment relates to a computer-implemented method for determining information for a specimen. The method includes assigning labels to each of multiple pixels in an image responsive to what is represented in each of the multiple pixels by inputting the image into a semantic segmentation model included in one or more components executed by a computer subsystem. The image is an image of a specimen generated by an imaging subsystem. The method also includes determining information for the specimen from the assigned labels and without a reference image for the specimen. The inputting and determining steps are performed by the computer subsystem.

Each of the steps of the method may be performed as described further herein. The method may also include any other step(s) that can be performed by the system, computer subsystem, component(s), and/or semantic segmentation models described herein. The computer subsystem may be configured according to any of the embodiments described herein, e.g., computer subsystem 36. The one or more components and the semantic segmentation model may also be configured according to any of the embodiments described herein. The method may be performed by any of the system embodiments described herein.

Figure 6:
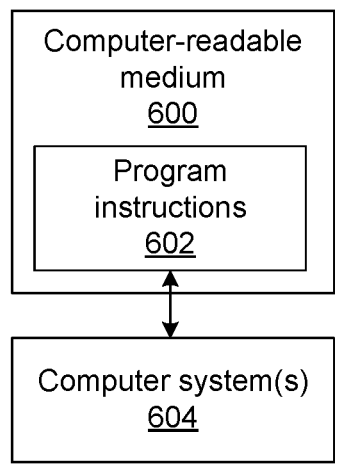
FIG. 6 is a block diagram illustrating one embodiment of a non-transitory computer-readable medium storing program instructions for causing a computer system to perform a computer-implemented method described herein.

An additional embodiment relates to a non-transitory computer-readable medium storing program instructions executable on a computer system for performing a computer-implemented method for determining information for a specimen. One such embodiment is shown in FIG. 6. In particular, as shown in FIG. 6, non-transitory computer-readable medium 600 includes program instructions 602 executable on computer system(s) 604. The computer-implemented method may include any step(s) of any method(s) described herein.

Program instructions 602 implementing methods such as those described herein may be stored on computer-readable medium 600. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system(s) 604 may be configured according to any of the embodiments described herein.

Further modifications and alternative embodiments of various aspects of the invention will be apparent to those skilled in the art in view of this description. For example, methods and systems for determining information for a specimen are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured to determine information for a specimen, comprising:
a computer subsystem; and
one or more components executed by the computer subsystem;
wherein the one or more components comprise a semantic segmentation model configured for:
assigning labels to each of multiple pixels in an image responsive to what is represented in each of the multiple pixels, wherein the image is an image of a specimen generated by an imaging subsystem;
assigning a first of the labels to one or more of the multiple pixels in which a defect is represented and a second of the labels to one or more additional of the multiple pixels in which one or more structures on the specimen are represented; and
assigning a third of the labels to one or more further of the multiple pixels in which one or more additional structures on the specimen formed under the one or more structures are represented; and
wherein the computer subsystem is configured for determining information for the specimen from the assigned labels and without a reference image for the specimen.

2. The system of claim 1, wherein the information determined for the specimen comprises predicted defect locations on the specimen.

3. The system of claim 1, wherein the information determined for the specimen comprises predicted repeater defect locations on the specimen.

4. The system of claim 1, wherein the semantic segmentation model is further configured for assigning a fourth of the labels to one or more other of the multiple pixels in which the defect is not represented, and wherein said assigning is performed without a reference image for the specimen.

5. The system of claim 1, wherein the information determined for the specimen comprises one or more defect attributes of one or more predicted defect locations on the specimen.

6. The system of claim 1, wherein assigning the first of the labels comprises assigning the first of the labels to the one or more of the multiple pixels in which one or more instances of a first type of a defect of interest are represented, and wherein the semantic segmentation model is further configured for assigning one or more other of the labels to one or more other of the multiple pixels in which the one or more instances of the first type of the defect of interest are not represented.

7. The system of claim 1, wherein assigning the first of the labels comprises assigning the first of the labels to the one or more of the multiple pixels in which a first defect of interest is represented and a fourth of the labels to one or more different of the multiple pixels in which a second defect of interest is represented, wherein the semantic segmentation model is further configured for assigning one or more other of the labels to one or more other of the multiple pixels in which the first and second defects of interest are not represented, and wherein the first and second defects of interest are different types of defects of interest.

8. The system of claim 1, wherein the labels assigned to each of the multiple pixels are selected from a predefined set of labels learned by the semantic segmentation model during training of the semantic segmentation model.

9. The system of claim 1, wherein the semantic segmentation model does not comprise any fully connected layers.

10. The system of claim 1, wherein the computer subsystem is further configured for training the semantic segmentation model for said assigning the labels with a training set comprising one or more patch images of one or more defects of interest generated by a deep learning model and labels assigned to each of multiple pixels in the one or more patch images.

11. The system of claim 10, wherein the deep learning model comprises a generative adversarial network.

12. The system of claim 10, wherein the training set further comprises one or more additional patch images of the one or more defects of interest or one or more additional defects of interest generated by the imaging subsystem and additional labels assigned to each of multiple pixels in the one or more additional patch images.

13. The system of claim 1, wherein the computer subsystem is further configured for training the semantic segmentation model for said assigning the labels with a training set comprising one or more patch images of one or more defects of interest generated by the imaging subsystem and labels assigned to each of multiple pixels in the one or more patch images.

14. The system of claim 1, wherein the imaging subsystem is a light-based imaging subsystem.

15. The system of claim 1, wherein the imaging subsystem is an electron-based imaging subsystem.

16. The system of claim 1, wherein the specimen is a wafer.

17. A non-transitory computer-readable medium, storing program instructions executable on a computer system for performing a computer-implemented method for determining information for a specimen, wherein the computer-implemented method comprises:
assigning labels to each of multiple pixels in an image responsive to what is represented in each of the multiple pixels by inputting the image into a semantic segmentation model included in one or more components executed by the computer system, wherein the image is an image of a specimen generated by an imaging subsystem, and wherein assigning the labels comprises;
assigning a first of the labels to one or more of the multiple pixels in which a defect is represented and a second of the labels to one or more additional of the multiple pixels in which one or more structures on the specimen are represented; and
assigning a third of the labels to one or more further of the multiple pixels in which one or more additional structures on the specimen formed under the one or more structures are represented; and
determining information for the specimen from the assigned labels and without a reference image for the specimen.

18. A computer-implemented method for determining information for a specimen, comprising:
assigning labels to each of multiple pixels in an image responsive to what is represented in each of the multiple pixels by inputting the image into a semantic segmentation model included in one or more components executed by a computer subsystem, wherein the image is an image of a specimen generated by an imaging subsystem, and wherein assigning the labels comprises;
   assigning a first of the labels to one or more of the multiple pixels in which a defect is represented and a second of the labels to one or more additional of the multiple pixels in which one or more structures on the specimen are represented; and
   assigning a third of the labels to one or more further of the multiple pixels in which one or more additional structures on the specimen formed under the one or more structures are represented; and
determining information for the specimen from the assigned labels and without a reference image for the specimen, wherein said inputting and determining are performed by the computer subsystem.

* * * * *